(12) United States Patent
Schlotterer et al.

(10) Patent No.: US 8,649,147 B2
(45) Date of Patent: Feb. 11, 2014

(54) TRIP UNIT COMMUNICATION ADAPTER MODULE EMPLOYING COMMUNICATION PROTOCOL TO COMMUNICATE WITH DIFFERENT TRIP UNIT STYLES, AND ELECTRICAL SWITCHING APPARATUS AND COMMUNICATION METHOD EMPLOYING THE SAME

(75) Inventors: John C. Schlotterer, Murrysville, PA (US); Arthur A. Anderson, Vandergrift, PA (US); Daniel A. Hosko, Green Tree, PA (US)

(73) Assignee: Eaton Corporation, Cleveland, OH (US)

( * ) Notice: Subject to any disclaimer, the term of this patent is extended or adjusted under 35 U.S.C. 154(b) by 139 days.

(21) Appl. No.: 13/324,114

(22) Filed: Dec. 13, 2011

(65) Prior Publication Data

US 2013/0148249 A1    Jun. 13, 2013

(51) Int. Cl.
    *H01H 73/00* (2006.01)
(52) U.S. Cl.
    USPC ........................................................ 361/115
(58) Field of Classification Search
    USPC ........................................................ 361/115
    See application file for complete search history.

(56) References Cited

U.S. PATENT DOCUMENTS

| | | | |
|---|---|---|---|
| 4,644,547 A | 2/1987 | Vercellotti et al. |
| 4,644,566 A | 2/1987 | Vercellotti et al. |
| 4,653,073 A | 3/1987 | Vercellotti et al. |
| 5,315,531 A | 5/1994 | Oravetz et al. |
| 5,341,191 A | 8/1994 | Crookston et al. |
| 5,548,523 A | 8/1996 | Wehrli, III et al. |
| 5,627,716 A | 5/1997 | Lagree et al. |
| 5,815,364 A | 9/1998 | Hurley et al. |
| 5,910,760 A | 6/1999 | Malingowski et al. |
| 6,055,145 A | 4/2000 | Lagree et al. |
| 6,144,271 A | 11/2000 | Mueller et al. |
| 2006/0224711 A1 | 10/2006 | Engel et al. |
| 2008/0158761 A1 | 7/2008 | Butland et al. |
| 2011/0286339 A1* | 11/2011 | Masuda .................... 370/248 |

FOREIGN PATENT DOCUMENTS

| | | |
|---|---|---|
| KR | 2001 0076542 A | 8/2001 |
| WO | 2011/058318 A1 | 5/2011 |

OTHER PUBLICATIONS

Eaton, (Oct. 2010). Instructional Leaflet IL01301033E: Installation instructions of Series NRX INCOM communications adapter module. Moon Township: Eaton).*
Eaton, (Dec. 2009). Instructional Leaflet IL01301035E: Installation instructions of Series NRX PROFIBUS DP communications adapter module (PCAM). Moon Township: Eaton).*
European Patent Office, "International Search Report and Written Opinion", Dec. 21, 2012, 10 pp.

* cited by examiner

*Primary Examiner* — Scott Bauer
(74) *Attorney, Agent, or Firm* — Eckert Seamans Cherin & Mellott, LLC; Kirk D. Houser

(57) ABSTRACT

A trip unit is for a circuit breaker and includes a plurality of capabilities defining one trip unit style selected from a plurality of different trip unit styles. The trip unit includes a processor including a communication interface having a communication protocol; and a communication adapter module including a first communication interface having the communication protocol, and a second communication interface. The communication adapter module is structured to learn the plurality of capabilities of the trip unit from the processor employing the communication protocol, and to communicate with any of the plurality of different trip unit styles including the one trip unit style.

21 Claims, 11 Drawing Sheets

TRIP UNIT COMMUNICATION ADAPTER MODULE EMPLOYING COMMUNICATION PROTOCOL TO COMMUNICATE WITH DIFFERENT TRIP UNIT STYLES, AND ELECTRICAL SWITCHING APPARATUS AND COMMUNICATION METHOD EMPLOYING THE SAME

BACKGROUND

1. Field

The disclosed concept pertains generally to electrical switching apparatus and, more particularly, to circuit interrupters, such as, for example, circuit breakers. The disclosed concept also pertains to trip units for circuit breakers. The disclosed concept further pertains to communication methods for such trip units.

2. Background Information

Electrical switching apparatus such as circuit interrupters and, in particular, circuit breakers, are well known in the art. See, for example, U.S. Pat. No. 5,341,191.

Circuit breakers are used to protect electrical circuitry from damage due to an overcurrent condition, such as an overload condition or a relatively high level short circuit or fault condition. Molded case circuit breakers typically include a pair of separable contacts per phase. The separable contacts may be operated either manually by way of a handle disposed on the outside of the case or automatically in response to an overcurrent condition. Typically, such circuit breakers include an operating mechanism, which is designed to rapidly open and close the separable contacts, and a trip unit, which senses overcurrent conditions in an automatic mode of operation. Upon sensing an overcurrent condition, the trip unit trips the operating mechanism to a trip state, which moves the separable contacts to their open position.

Industrial circuit breakers often use a circuit breaker frame, which houses a trip unit. See, for example, U.S. Pat. Nos. 5,910,760; and 6,144,271. The trip unit may be modular and may be replaced, in order to alter the electrical properties of the circuit breaker.

It is well known to employ trip units which utilize a microprocessor to detect various types of overcurrent trip conditions and to provide various protection functions, such as, for example, a long delay trip, a short delay trip, an instantaneous trip, and/or a ground fault trip. The long delay trip function protects the load served by the protected electrical system from overloads and/or overcurrents. The short delay trip function can be used to coordinate tripping of downstream circuit breakers in a hierarchy of circuit breakers. The instantaneous trip function protects the electrical conductors to which the circuit breaker is connected from damaging overcurrent conditions, such as short circuits. As implied, the ground fault trip function protects the electrical system from faults to ground.

Modern circuit breaker trip units are generally expected to support multiple different communication (e.g., field bus) protocols without the use of a protocol translator. Traditionally, however, a unique communication adapter has been required for each communication protocol and for each style of trip unit.

It is believed that manufacturers of trip units have taken two approaches to solve this problem. One approach is to integrate one of the many field bus protocols into the trip unit and provide a protocol adapter to convert the native protocol to the desired field bus protocol. Another approach is to provide a plug-in module for the trip unit for each specific field bus protocol. This plug-in module is unique for each trip unit-field bus combination.

There is room for improvement in electrical switching apparatus.

There is also room for improvement in trip units for circuit breakers.

There is further room for improvement in communication methods for such trip units.

SUMMARY

These needs and others are met by embodiments of the disclosed concept in which a communication protocol is employed between a trip unit and a communication adapter module therefor. The communication adapter module is structured to learn a plurality of capabilities of the trip unit by employing the communication protocol and to communicate with any of a plurality of different trip unit styles.

In accordance with one aspect of the disclosed concept, a trip unit is for a circuit breaker. The trip unit includes a plurality of capabilities defining one trip unit style selected from a plurality of different trip unit styles. The trip unit comprises: a processor comprising a communication interface including a communication protocol; and a communication adapter module comprising a first communication interface including the communication protocol, and a second communication interface, the communication adapter module being structured to learn the plurality of capabilities of the trip unit from the processor employing the communication protocol, and to communicate with any of the plurality of different trip unit styles including the one trip unit style.

As another aspect of the disclosed concept, a method of communication comprises: employing a trip unit including a plurality of capabilities defining one trip unit style selected from a plurality of different trip unit styles; employing a processor comprising a communication interface including a communication protocol; employing a communication adapter module comprising a first communication interface including the communication protocol, and a second communication interface; learning by the communication adapter module the plurality of capabilities of the trip unit from the processor employing the communication protocol; and communicating by the communication adapter module with any of the plurality of different trip unit styles including the one trip unit style.

As another aspect of the disclosed concept, an electrical switching apparatus comprises: separable contacts; an operating mechanism structured to open and close the separable contacts; and a trip unit including a plurality of capabilities defining one trip unit style selected from a plurality of different trip unit styles, the trip unit comprising: a processor comprising a communication interface including a communication protocol, and a communication adapter module comprising a first communication interface including the communication protocol, and a second communication interface, the communication adapter module being structured to learn the plurality of capabilities of the trip unit from the processor employing the communication protocol, and to communicate with any of the plurality of different trip unit styles including the one trip unit style.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a digital signal processor (DSP); a microprocessor; a microcontroller; a microcomputer; a central processing unit; a mainframe computer; a mini-computer; a server; a networked processor; a programmable logic device (PLD); a combination of a plurality of logic gates; or any suitable processing device or apparatus.

As employed herein, the term "setting" means setpoint, value, numeric value, digital or boolean state, character(s) such as alphabetic character(s) and/or alpha-numeric character(s), or other representations of operating features and/or user-interface configurations of a trip unit. Non-limiting examples of settings include system data; current curve setpoint values; voltage setpoint values; and settings for alarms, and auxiliary relays. For example, settings can be altered through programming, configuration, entry or adjustment by a user or programming device.

As employed herein, the term "trip unit style" shall mean a particular trip unit style corresponding to a particular style identifier; a particular trip unit style corresponding to a particular communication message structure for settings, real-time data and/or event data; or a particular trip unit manufacturing configuration that determines the capabilities of the trip unit. A given style trip unit has a non-varying structure for settings, real-time data or event data. Non-limiting examples of style differences include number of poles, ground fault capabilities, IEC vs. IEEE curves, and maintenance mode capable.

The disclosed concept is described in association with a four-pole circuit breaker, although the disclosed concept is applicable to electrical switching apparatus having any number of poles.

Figure 1A:
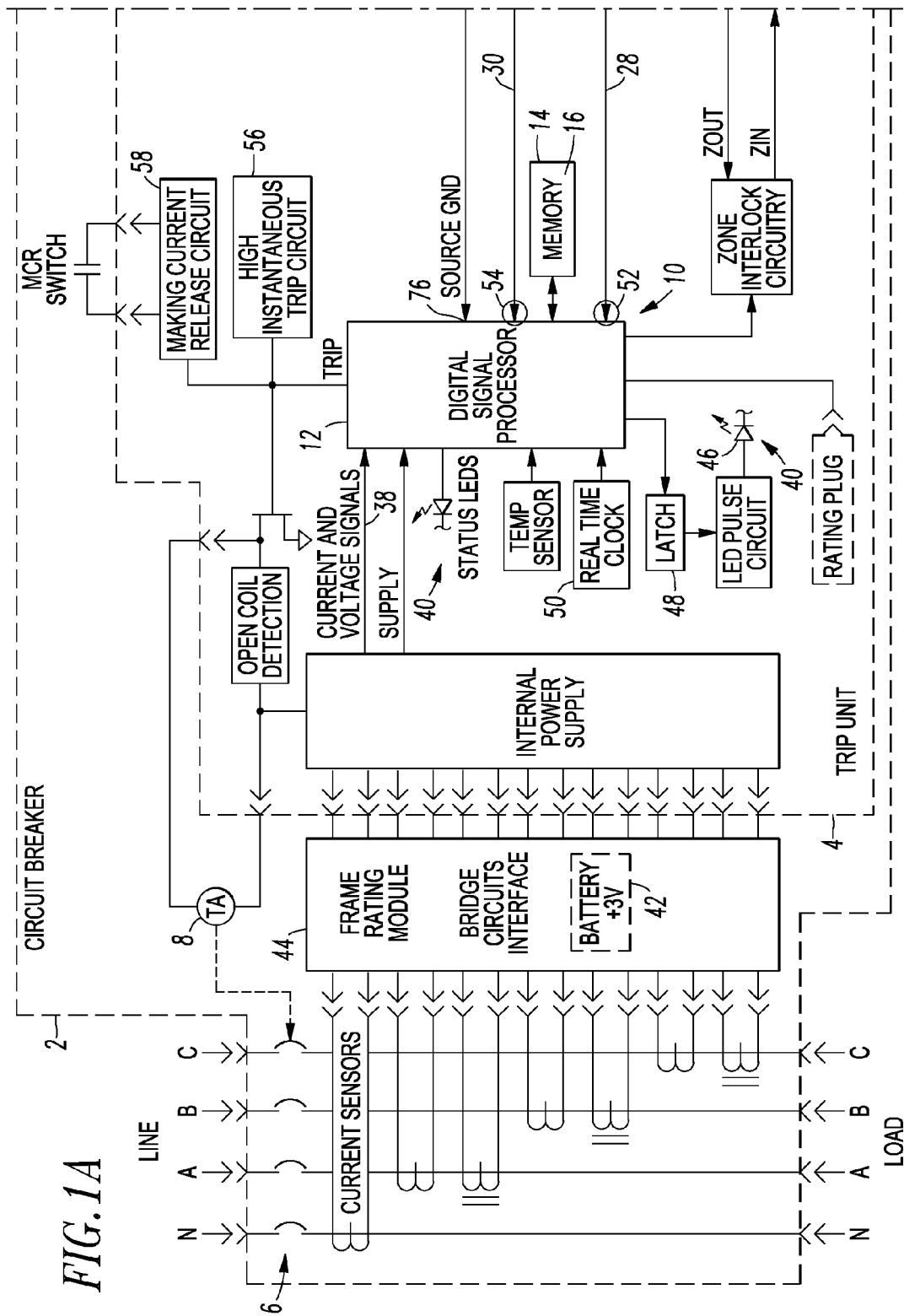
FIGS. 1A-1B form a block diagram of a circuit breaker including a trip unit in accordance with embodiments of the disclosed concept.
Figure 1B:
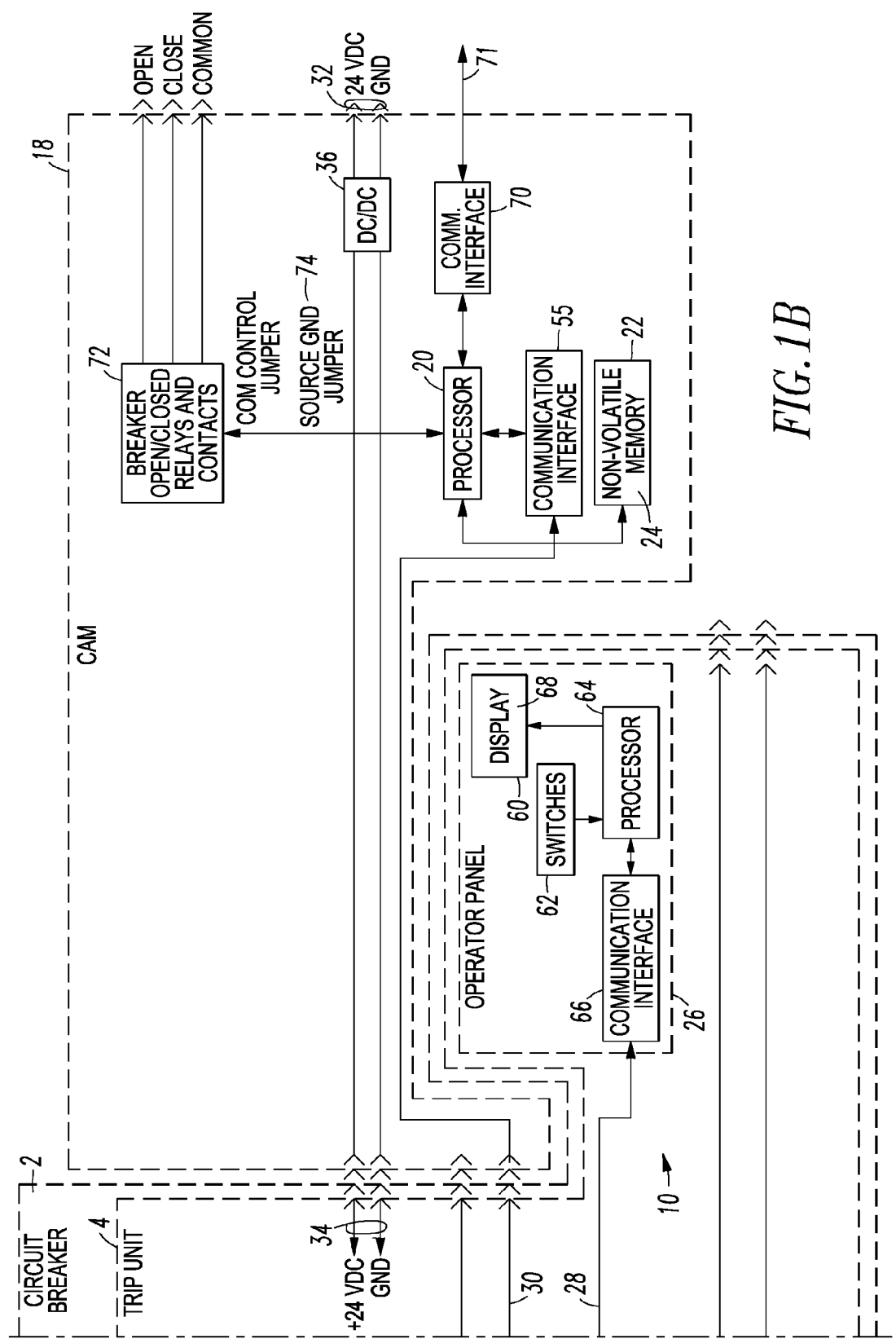

The disclosed circuit breaker trip unit 4 of FIGS. 1A-1B employs a plug'n'play communication protocol approach to a field bus interface in order to reduce the number of styles of a communication adapter. Only a single communication adapter module (CAM) 18 is employed for each field bus, independent of the particular trip unit style. In other words, for example and without limitation, a single Modbus® CAM (M-CAM) will work with all of the particular family of trip units (e.g., family style #1; family style #2). This permits a single style of CAM to support a plurality of different trip unit styles, which reduces the number of styles of the example CAM 18.

The disclosed trip unit architecture includes three example independent functional sections: (1) a processor, such as the example protection processor (PP) 10; (2) an operator panel, such as the example Human-Machine Interface (HMI), such as a trip unit's display/operator panel 26; and (3) a communication adapter module (CAM) 18. The CAM 18 is a device that connects a product to a communication network (e.g., a field bus). Alternatively, the PP 10 and the HMI 26 can be combined into a single unit.

FIGS. 1A-1B show a circuit breaker 2 including the trip unit 4. The circuit breaker 2 also includes separable contacts 6 and an operating mechanism, such as the example trip actuator (TA) 8 structured to open and close the separable contacts 6. The trip unit 4 cooperates with the trip actuator 8 to trip open the separable contacts 6. The trip unit 4 includes a first component, such as the example protection processor (PP) 10, having a processor 12 and a first memory 14 storing a first set of a plurality of trip unit settings 16, and a second component, such as the example communication adapter module (CAM) 18, which is separable from the example PP 10 or separable from the trip unit 4. The example CAM 18 includes a processor 20 and a second memory, such as the example non-volatile memory 22, storing a second set of a plurality of trip unit settings 24. The example CAM 18 is structured to save the trip unit settings 16 as the saved settings 24 in the second memory 22, and to restore the saved settings 24 in the first memory 14 of the PP 10 or of another PP (not shown) of another trip unit (not shown). Hence, if the trip unit 4 or PP 10 fails, then the CAM 18 can be separated therefrom and installed on another trip unit (not shown) or PP (not shown), and the saved settings 24 can be downloaded from the CAM memory 22 to the trip unit memory 14 of the other trip unit or PP. The PP 10 saves the saved settings 24 in the separable CAM 18 and provides the ability to restore those settings 24 in a replacement trip unit (not shown) or PP (not shown). Restoration of settings, such as setpoints, is disclosed by U.S. patent application Ser. No. 13/107,143, filed May 13, 2011.

An important use of the CAM non-volatile memory 22 is for storage of event data and trip unit communication configuration. Saving the communication configuration of the trip unit 4 eliminates the need to relearn on each power-up as long as the CAM 18 is connected to the same trip unit 4. Without non-volatile storage of event data, only the present value of real-time data could be communicated by the CAM 18 to the field bus 71.

The example trip unit 4 is partitioned into the three example independent functional sections: (1) the PP 10; (2) the HMI 26; and (3) the CAM 18, that communicate, for example, through two example full-duplex serial links 28,30 (e.g., without limitation, RS-422): (1) the serial link 28 is between the PP 10 and the HMI 26; and (2) the serial link 30 is between the PP 10 and the CAM 18. Each of the PP 10, the HMI 26 and the CAM 18 is, thus, structured to communicate through one or both of the example full-duplex serial links 28,30.

The trip unit 4 includes one style of a plurality of different styles (e.g., without limitation, N11RLSIG, N11RLSI, N11RLSIA, N11IEC, N11IECEF, N11RIEC, N11RIECEF, N11LSIG, N11LSI, and N11LSIA) (e.g., the "R" means that the style has an arc reduction maintenance (ARM) or maintenance mode feature; the "LSI" means long delay, short delay and instantaneous protection; the "LSIA" means long delay, short delay, instantaneous protection and ground alarm; the "LSIG" means long delay, short delay, instantaneous and ground protection; the "IEC" means international LSI (long delay, short delay and instantaneous protection); and the "IECEF" means international LSI with earth fault or ground protection). The CAM 18 is structured to save a representation of the one particular style of the particular trip unit 4 in the non-volatile memory 22.

In accordance with the disclosed concept, the details of what real-time data, event generation, and setpoint parameters the PP 10 supports are not coded into the CAM 18 or the HMI 26. Instead, the CAM 18 and the HMI 26 "learn" the capabilities of the trip unit 4 from the PP 10 using a suitable serial communication protocol.

The PP 10 provides the protective functionality of the trip unit 4. The PP 10 receives all inputs employed to perform protection and operates independently to open the circuit breaker 2 under fault conditions. A limited human interface is provided on the PP 10 consisting of only trip and status indicators 40. This limited human interface is only employed for battery-backed display of trip information when no auxiliary power is available. If auxiliary power is available, then the full set of trip information is available using the HMI 26. The PP 10 performs the protective function without the HMI 26 or the CAM 18.

The HMI 26 contains, for example and without limitation, an LCD display 60 and pushbuttons 62 permitting the operator to perform a number of functions including setpoint adjustment, real-time data adjustment, and historic event review. The number of historic events saved is determined by the capabilities of the HMI 26, as the history is actually stored there. Usually, the HMI 26 and PP 10 are packaged into a single assembly (the trip unit 4). Because of the simple interface between the HMI 26 and PP 10, the HMI 26 is a field-replaceable part of the trip unit 4.

The CAM 18 is a physically separate module that provides connection to a field bus. Multiple CAM styles are available, each supporting a different field bus; however, each CAM style supports the same serial communication protocol with the PP 10.

A non-limiting example serial communication protocol employed between the PP 10 and the CAM 18 or HMI 26 is a full-duplex, asynchronous serial character-oriented protocol using 11-bit characters (e.g., one start, nine data, and one stop character) operating at 57.6 kbps. Both the PP 10 and the CAM 18 or HMI 26 can request and/or transmit data and configuration information. The structure of all message packets is as follows: (1) packet initiation and framing consisting of command, source address, and destination address; (2) packet sequence number; (3) optional information/data; (4) 16-bit CRC; and (5) packet termination.

Four types of messages are passed between the PP 10 and the CAM 18 or HMI 26: (1) configuration messages; (2) data messages; (3) request messages; and (4) acknowledgement messages.

Configuration messages contain information regarding the structure and meaning of data and setpoint messages. They are sent in response to request messages used to determine the structure and format of real-time, setpoint, and event data packets.

Data messages contain real-time, setpoint, or historic (event) data. Their structure is described by configuration messages. In general, real-time and event data are transmitted unsolicited on change. Setpoint data is transmitted only on request or when setpoints are changed.

Request messages request the target device to send data, setpoint, or configuration messages or to perform some action.

Acknowledgement messages are sent to acknowledge the receipt or acceptance of data or action request messages sent by the other device on the full-duplex link.

After the CAM 18 or HMI 26 has "learned" the message structure of a device, such as the PP 10, it stores that information in non-volatile memory (e.g., 22) to minimize the learning delay on power-up. The style identifier (ID) of each device is used to determine that new configuration data must be discovered. The message structure of real-time data, event data, and setpoints is linked to the style ID. Each unique style ID has an identical real-time data, event data, and setpoint structure. Certain data logging configurations may be configurable without changing the style ID and are flagged in the configuration information as being variable.

Using the serial communication protocol, information is transmitted as a response to a request or as an unsolicited transaction. For example, the PP 10 will transmit status and real-time value messages whenever a change-of-state occurs. This eliminates the scanning requirements of a typical master-slave protocol. The HMI 26 or CAM 18 keeps a present-value database of real-time objects to avoid the latency of placing a request to the PP 10 for each value needed. This real-time database is updated whenever a value changes and the PP 10 transmits an unsolicited update message to the HMI 26 or CAM 18. Requests for real-time data from the HMI 26 or CAM 18 are unnecessary.

Descriptions of the real-time data packets are sent by the PP 10 as a response to a request for that information from either the HMI 26 or CAM 18.

The trip unit 4 has non-volatile storage 14 for only a single event of each type. For example and without limitation, the trip unit 4 can categorize events into the following types: (1) basic (e.g., power up; setpoint download; enter test; exit test; plug change; maintenance mode; communications open/close); (2) time adjustment; (3) waveform capture; (4) energy log; (5) trip; (6) major alarm; and (7) minor alarm. After an event has been successfully transmitted to both the CAM 18 and HMI 26, it is deleted from storage of the trip unit 4. The trip unit 4 will retry several times to transmit the event. However, if the number of retries is exceeded or the device is no longer communicating, the event will be deleted and lost to that device. For example, a non-functioning CAM 18 will not stall the event process for the HMI 26. Both the CAM 18 and HMI 26 store events in their own non-volatile storage (e.g., 22) providing customizable capacity for each adapter.

The CAM 18 and HMI 26 provide suitable storage for data logging and events since the trip unit 4 deletes the latest data log or event after it has been transmitted to both the CAM 18 and HMI 26.

Protection setpoints are stored in the trip unit 4. In general, the CAM 18 and the HMI 26 employ temporary copies of these while changing them. Optionally, the CAM 18 may store non-working back-up copies of protection setpoints for maintenance purposes. Also, the CAM 18 typically has a few setpoints associated with it, such as communication network parameters (e.g., bit-rate; parity; address).

Example +24 VDC control power 32 is connected to the CAM 18 (if the CAM 18 is part of the circuit breaker 2). The CAM 18 then sends +24 V 34 to the trip unit 4 via a DC/DC converter 36 in the CAM 18 that provides galvanic isolation between the +24 VDC control power 32 and the trip unit 4. If no CAM 18 is present, then a separate +24 V power supply (not shown) is employed for each trip unit, such as 4, in order to maintain isolation between multiple trip units (not shown).

The PP 10 provides the protective function of the trip unit 4. The PP 10 receives a plurality of inputs, such as 38, employed to perform the protective function and operates independently to open the circuit breaker 2. Protection settings 16 of the trip unit 4 are saved redundantly as the saved settings 24 in the CAM non-volatile memory 22. An example limited human interface 40 is provided on the PP 10 and includes, for example, trip and status indicators. Entry or adjustment of the settings 16,24 can be accomplished through serial communication with either the HMI 26 or the CAM 18.

The PP 10 can also output to a number of trip and status indicators, such as a plurality of cause of trip LEDs 46. A +3 VDC battery 42 in a frame rating module/bridge circuits interface 44 provides redundant power for the cause of trip LEDs 46. If the circuit breaker 2 were to trip and control power be lost, then the LED states are maintained in a latch 48 by the battery 42. This battery 42 can be located at any suitable position on the trip unit 4.

The PP 10 provides the circuit breaker protective function responsive to the plurality of inputs 38 and the trip unit settings 16, operates independently responsive to the protective function to open the circuit breaker 2, and stores the trip unit settings 16 in the first memory 14. The protective function and other functions provided by the PP 10 can include, for example and without limitation, current and voltage protection, metering, waveform capture, event logging, a real time clock 50, expanded earth fault protection, health buffers, expanded self-diagnostics, and relay control.

The processor 12 of the PP 10 can enter or adjust the trip unit settings 16 through communication with either one of the HMI 26 and the CAM 18. The processor 12 can be a digital signal processor (DSP) and include a communication interface 52 that communicates with the HMI 26, and a communication interface 54 that communicates with the CAM communication interface 55.

A high instantaneous trip circuit 56 is a separate analog peak detecting circuit set to match the withstand rating of the frame of the circuit breaker 2. The high instantaneous trip circuit 56 can trip the circuit breaker 2 without any intervention by the processor 12. This provides trip operation faster than a short delay setting and acts as a fail-safe in the event of a failure of the processor 12.

A making current release (MCR) circuit 58 is a safety feature that prevents the circuit breaker 2 from being closed and latched-in on a fault. This is an non-adjustable sensing circuit.

The PP 10, as shown, also includes the HMI 26. The HMI 26 includes a display, such as the example LCD display 60, and a plurality of entry members, such as the example pushbuttons or switches 62, structured to enter or adjust the trip unit settings 16. A processor 64 outputs to the example display 60 and inputs from the example switches 62. This permits an operator to perform a number of functions including, for example and without limitation, setpoint entry or adjustment by inputting from the switches 62, in order to enter or adjust the trip unit settings 16.

The HMI 26 provides the human interface for the trip unit 4. Typically, the HMI 26 is coupled to or part of the PP 10 and, preferably, is field replaceable. The HMI 26, which provides display functions and a user interface, includes the processor 64 and the communication interface 66.

An inter-unit communication protocol permits the HMI 26 to request via the processor 12 that the CAM 18 acquire (upload) the current trip unit settings 16 from the trip unit 4 and save them as the saved settings 24 in the CAM non-volatile memory 22. The HMI 26 can request via the processor 12 that the CAM 18 upload the (changed) trip unit settings 16 from the PP 10 and save the (changed) settings 16 as the saved settings 24 in the CAM non-volatile memory 22. The HMI 26 can also change a number of the trip unit settings 16 at the PP 10 and request via the processor 12 that the CAM 18 upload the (changed) trip unit settings 16 from the PP 10 and save the (changed) settings 16 as the saved settings 24 in the CAM non-volatile memory 22.

Also, the HMI 26 can request via the PP 10 that the CAM 18 download the saved settings 24 to the trip unit 4. The HMI 26 can further request via the PP 10 that the CAM 18 download the saved settings 24 to the PP 10 to save the saved settings 24 as the trip unit settings 16 in the memory 14.

The HMI display 60 includes a user menu 68 structured to request via the PP 10 that the CAM 18 download the saved settings 24 in the non-volatile memory 22 to a replacement PP 10 to store in the memory 14 thereof.

The CAM 18 includes a second communication interface 70 that provides a connection to a communication network (e.g., without limitation, a field bus 71). For example, multiple styles of the CAM 18 can be provided to support various field bus interfaces (e.g., without limitation, Modbus®; PROFI BUS PROCESS FIELD BUS®; INCOM; Ethernet; DeviceNet). For example and without limitation, an Ethernet CAM supports a "tool kit" that provides a set of common machine-to-machine services along with a web page server, a BACnet interface, and ModBus® TCP. Non-limiting examples of the INCOM network and protocol are disclosed in U.S. Pat. Nos. 4,644,547; 4,644,566; 4,653,073; 5,315,531; 5,548,523; 5,627,716; 5,815,364; and 6,055,145, which are incorporated by reference herein. Hence, the CAM 18 can be selected from a plurality of different CAMs (not shown) to provide an interface to a selected one of a plurality of corresponding different field busses (not shown).

The CAM 18 includes the non-volatile memory 22, or a reserved area of such memory 22, to store the saved settings 24, which are a copy of the trip unit settings 16. The CAM non-volatile memory 22 is also employed to store data logs (e.g., snapshots of real-time data) and events. Non-volatile memory features may vary with the particular field bus implementation of the CAM 18.

The CAM 18 further includes a set 72 of breaker open/close relays and contacts. Circuit breaker open and close relays (not shown) are controlled by the CAM processor 20 to control relay contacts (not shown) in response to a communication request through the communication interface 70 for opening or closing the circuit breaker 2. A motor operator (not shown) could be wired through the close relay contact to close the circuit breaker 2, while a circuit breaker shunt trip (not shown) would be wired through the open relay contact to open the circuit breaker 2.

A "source ground" jumper 74 on the CAM 18 selects between residual ground current computation by the processor 12, or direct measurement of ground current via an external ground current transformer (CT) (not shown). There are two ground fault modes that the circuit breaker 2 can be configured for: source ground or residual ground. The trip unit processor 12 inputs a jumper input 76 to determine the selected configuration for the circuit breaker 2. With the jumper 74 in, the circuit breaker 2 is in a source mode, and without the jumper 74, the circuit breaker 2 is in a residual mode.

The CAM 18 and HMI 26 are structured to (indirectly) communicate with each other via the PP 10 by relaying messages through the trip unit 4. The communication protocol has a limited address field that permits each device (CAM 18, HMI 26, or trip unit 4) to direct the communication to another device. For example, the HMI 26 needs to learn and adjust setpoints located in both the trip unit 4 and the CAM 18. Since it physically connects only to the trip unit 4, it sets the address to the CAM 18 and the trip unit 4 retransmits messages from the HMI 26 to the CAM 18 when it detects the address of the CAM 18 in the message packet. Responses from the CAM 18 are likewise retransmitted to the HMI 26 when the trip unit 4 detects the HMI's address.

The PP 10 describes the real-time data, historic event data, and setpoint data it supports to both the HMI 26 and CAM 18. In this fashion, changes in the capabilities of the trip unit 4 are communicated to both the HMI 26 and the CAM 18 on initialization. New setpoints, real time objects, or additional event logging capabilities are implemented by modification of only the PP 10.

The number of historic events saved by either the HMI 26 or CAM 18 is determined by the capabilities of the HMI 26 and CAM 18, since the history is actually stored in both the HMI 26 and CAM 18. Typically, the HMI 26 is coupled with the PP 10 and, preferably, is field replaceable.

The capabilities (e.g., without limitation, details of what real-time data, event generation, and setpoint parameters) supported by the PP 10 are not coded into the CAM 18. Instead, the CAM 18 "learns" the capabilities of the trip unit 4 from the PP 10 using the disclosed communication protocol. This permits a single style of CAM 18 to support a wide range of different trip unit styles with different capabilities, thereby dramatically reducing inventory and manufacturing costs.

The disclosed communication protocol (Communication Adapter Interface) (CAI) is provided between a processor for a protective/metering/control product (such as the example PP 10 for the trip unit 4 and circuit breaker 2) and the HMI 26 and/or CAM 18. The CAI protocol is a peer-to-peer protocol as compared with a master-slave protocol. This changes the way data is obtained from a device from "data-pull" to "data-push". While a master device using a master-slave protocol must poll each slave device for all data it needs, under the disclosed CAI protocol, a device, such as a protective device, autonomously sends only changed data to the CAM 18, thereby dramatically reducing data latency. The CAI protocol support only a single processor, such as the example PP 10, and optionally its HMI 26, on a corresponding communication network. The HMI 26 and CAM 18 learn the capabilities of the single processor for a wide range of devices on the CAI communication network using specific configuration description commands This permits the single processor to organize its real-time data buffers in new configurations, optimized for transmission "on change". Data objects and their formats are not pre-programmed Instead, the single processor describes supported real-time and historical data by object ID. If, for example, a new data object is created after the CAM 18 is released, it can still handle the new data object. Additionally, the format of the new data object is flexible and is not limited to, for example and without limitation, a floating point data format.

For example, using the CAI description protocol, the HMI 26 or CAM 18 can learn the structure, properties, limits, etc. of setpoint messages supported by the corresponding device (e.g., trip unit 4). The example CAI protocol supports, for example and without limitation, up to four device addresses: the protective/control product, the HMI 26, the CAM 18, and an additional auxiliary HMI or CAM 18. The CAM 18 generally supports a minimal collection of setpoints (e.g., without limitation, MAC address; IP address; bit rate). The CAI protocol permits the HMI 26 to learn and adjust these CAM setpoints without having to be pre-programmed for each type of CAM device. A hierarchal setpoint group/block arrangement permits the device to control dependencies between setpoints without requiring customized programming in the HMI 26 for each device.

As shown in FIG. 1A, the example PP 10 includes the analog inputs 38, a thermal memory (not shown), a programming port (not shown), the real time clock 50, the nonvolatile memory 14, a zone interlock circuit, communication interfaces 52,54, the trip actuator 8, and the processor 12.

The analog inputs 38 provide current and voltage inputs from each phase. These are filtered and scaled by signal conditioning circuitry 44 to the appropriate levels for reading by analog-to-digital converters (not shown) within the processor 12. Additional analog inputs (e.g., without limitation, temperature; voltage; reference; trip actuator sense) are employed to provide supplementary information for example metering and protection functions.

A thermal memory emulation circuit (not shown) provides an analog voltage that the processor 12 reads after powering up. This voltage approximates the thermal characteristics of the circuit breaker mechanism, providing a "starting point" for the protection function. By storing a "protection bucket" as an analog voltage, "cooling" can be approximated by a resistor (not shown) in parallel with a storage capacitor (not shown). This approach is superior to saving a protection bucket value in non-volatile memory on loss of power since there would be no cooling effect during the power-off time.

A processor programming port (not shown) is employed to program the processor 12. This is typically done once in the factory.

The real time clock 50 is employed to time-tag events (e.g., without limitation, trips; settings changes; alarms). The real time clock 50 contains a super-capacitor (not shown) that is charged when the trip unit 4 is powered in order that time is maintained during a power cycle.

The nonvolatile memory 14 is employed to store certain data indefinitely and/or over a power cycle. Data of this type include, for example and without limitation, events, setpoints, calibration constants, and factory settings.

The zone interlocking circuit coordinates a hierarchy of circuit breakers. A circuit breaker may delay tripping for a predetermined time, thereby allowing a "downstream" circuit breaker to trip first.

The communication interfaces 52,54 include, for example and without limitation, RS-422 interfaces that provide level shifting and possible voltage isolation for communications to and from the HMI 26 and CAM 18. Local LEDs 40,46 provide a visual indication of the status of the trip unit 4. A reset pushbutton (not shown) is employed to clear an alarm or trip indication.

The trip actuator circuit 8 contains logic and current amplification, enabling a trip solenoid to be activated by the processor 12. The solenoid may also be activated directly by input signals, thereby bypassing the processor 12, under extremely high input currents or in the event of a processor failure.

The example processor 12 contains programming to perform protection, metering, event capture, and communication functions. The example metering function converts voltage and current inputs to engineering units. These values are also sent to the protection algorithms to determine whether a trip condition exists. Certain events are time-stamped and stored in the nonvolatile memory 14 for eventual transmission to the HMI 26 and/or CAM 18. Metered values, breaker status, and events information are transmitted over the communications ports 52,54. In addition, various settings may be read or written over the communications ports 52,54.

Figure 3:
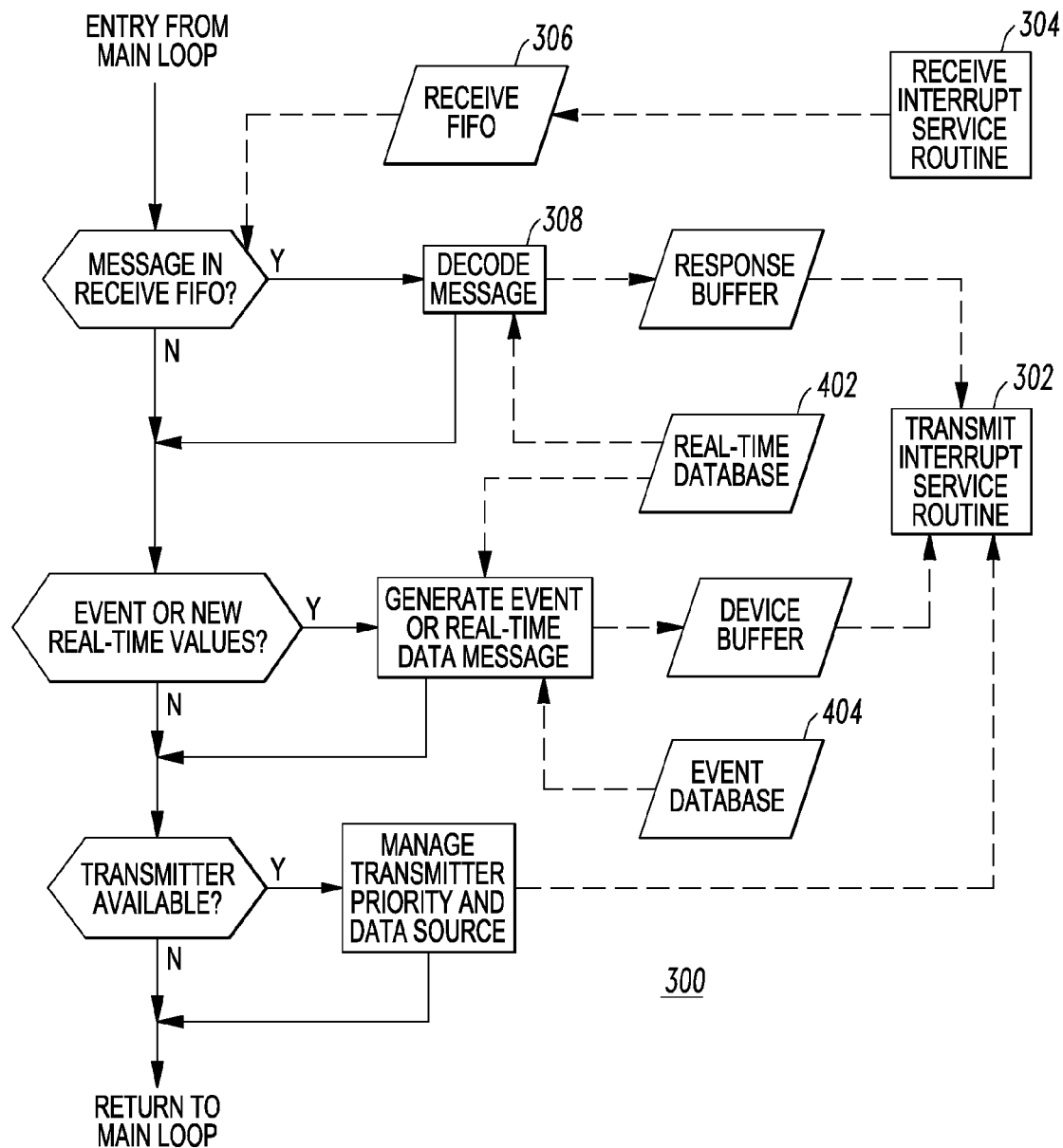
FIG. 3 is a flow chart of communication port processing of the protection processor of FIG. 1A.

The example PP 10 includes protection processor firmware having a foreground process (main loop) 200 and various interrupt-level processes. The PP 10 supports the following interrupt processes: timer interrupt service routine, analog-to-digital (A/D) interrupt service routine, trip actuator drive interrupt service routine, "Van" zero-crossing interrupt service routine, and communication port transmit and receive interrupt service routines 302,304 (FIG. 3). A timer interrupt service routine interrupt occurs every about 10 ms and is employed to provide timer functions for the foreground process 200.

The A/D interrupt service routine interrupt occurs, for example and without limitation, 64 times each line-cycle frequency cycle, and is the result of an A/D converter subsystem completing a group of 16 A/D conversions. The processor 12 preferably includes a hardware-controlled A/D sequencer subsystem (not shown) that can be programmed to complete up to eight pairs of simultaneous samples and pipelined A/D conversions. The sequence of 16 conversions is initiated by a hardware timer (not shown) and completes without any processor intervention. The A/D interrupt service routine accesses the 16 conversion results and processes them into instantaneous current samples for the three-phase currents, a source ground current, and three phase-to-neutral voltages. These samples are multiplied by appropriate calibration constants to convert to engineering units. Voltage and current sample values are employed as follows: (1) samples are saved in a circular buffer for use in oscillographic waveform capture; (2) samples are squared and summed for use in foreground RMS calculations; (3) samples are multiplied by sine and cosine values for use in total harmonic distortion (THD) computations; and (4) current and voltage samples are multiplied for use in power computation. Every ½ line cycle (32 A/D interrupts), a sum-of-squares and a sum-of-products values are passed to the foreground metering and protection routines 202,204 for RMS calculation.

The trip actuator drive interrupt service routine interrupt occurs whenever the trip actuator 8 is driven either by the PP 10 or the external override circuitry 56,58. It is used to generate trip events and set LED indicators 40.

The "Van" zero-crossing interrupt service routine interrupt occurs on the positive zero-crossing of the phase A to neutral voltage and is employed for line frequency measurement.

The communication port transmit and receive interrupt service routines 302,304 permit the example PP 10 to communicate with the CAM 18 and the HMI 26 through a pair of full duplex UARTs (not shown) for the communication ports 52,54. Each UART generates a transmit and a receive interrupt on a per character basis. Receive interrupt service removes the received character from the UART and places it in a receive FIFO (306 of FIG. 3) for foreground processing at 206 or 208 on a message basis. When characters are received, they are discarded until a start of message character is detected. After a message is in progress, characters are entered into the communication port's receive FIFO. When an end of message character is received, the message is passed to the foreground communication routine 206 or 208 for interpretation. The transmit interrupt service routine 302 removes characters from one of several transmit buffers constructed by the foreground communication routine 206 or 208 and sends them to the UART for transmission to the CAM 18 or the HMI 26. The foreground communication routine 206 or 208 constructs a full message and the transmit interrupt service routine 302 sends it out the port a character at a time.

Figure 2:
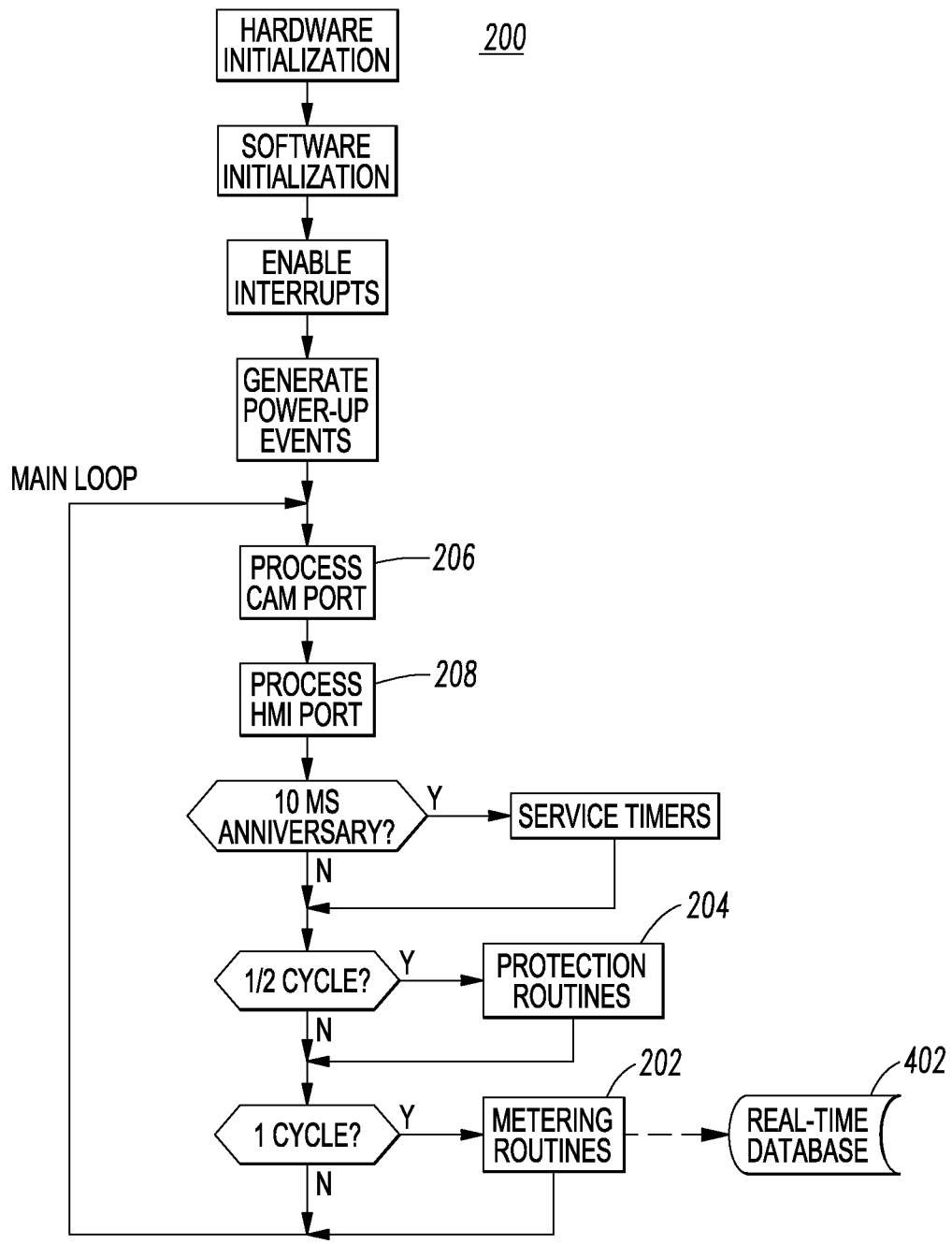
FIG. 2 is a flow chart of a main foreground process of the protection processor of FIG. 1A.

The foreground process 200 employs foreground code, which is a single thread that first initializes the hardware and software of the trip unit 4, and then continuously loops through a series of routines that perform all communication, protection, and metering functions as shown in FIG. 2. Control flow in FIGS. 2-11 is shown in solid line drawing, while data flow is shown in dotted line drawing.

Another foreground process, a communication port process 300 of FIG. 3, is employed to process both the CAM 18 and the HMI 26. Each port employs its own variable structure containing all character buffers, FIFOs, and other variables. The process 300 represents the contents of routines 206,208 of FIG. 2. Since the communication protocol is identical, common code is used to process both the CAM 18 and HMI 26 using separate CAM and HMI port databases addressed by pointers.

The receive ISR 304 and the transmit ISR 302 are actually four different ISRs. For economy of illustration, only two ISRs are shown since the flow is identical for both of the CAM and HMI communication ports. The CAM port database, which includes the CAM receive FIFO 306, CAM device buffer (shown in FIG. 4) and CAM response buffer (shown in FIG. 4), and the HMI port database, which includes the HMI receive FIFO 36, HMI device buffer (shown in FIG. 4) and HMI response buffer (shown in FIG. 4), are accessed by CAM and HMI transmit and receive ISRs 302,304 as directed by data pointers when the routines are called.

As characters are received from the CAM 18 or the HMI 26, they are processed by the receive ISR 304 and loaded into the appropriate receive FIFO 306 or 36. Multiple messages may be stored in the FIFO 306 or 36 for processing by the foreground receive-message task decoder 308. The receive message task decoder 308 processes messages in the order they are received. The message is checked for validity and then is decoded. It is processed as one of the following message types: (1) the message is directed to the other port; in this case, the other port is requested to retransmit it to the other device; once transmitted, it is removed from the receive FIFO 306 or 36; and (2) the message is a request for configuration data.

Figure 4:
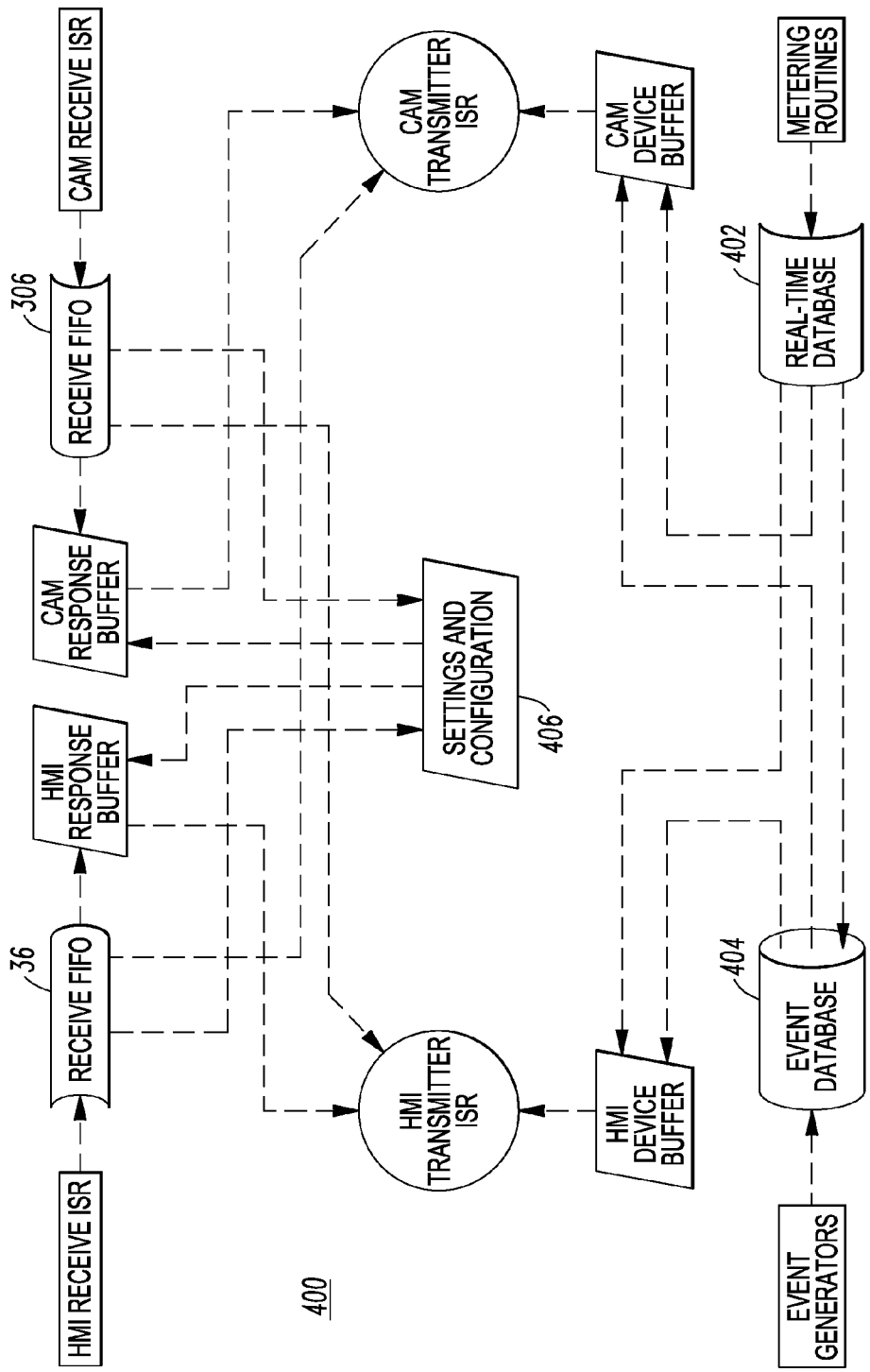
FIG. 4 is a flow chart of communication data flow of the protection processor of FIG. 1A and the CAM and HMI processors of FIG. 1B.

FIG. 4 shows the communication data flow 400 of the PP 10, the CAM 18 and the HMI 26. The trip unit 4 uses three primary databases: (1) real-time data 402; this is the present value of all currents, voltages, THD, power factor, and other metered values; (2) event data 404; this is a snapshot of real-time data that is captured when an event is generated; the trip unit 4 saves the data associated with the last of each event type; and (3) settings and configuration 406; these are setpoints stored in the trip unit 4 that control protection and alarm functions.

The HMI 26 communicates with the PP 10 via the CAI protocol. The HMI 26 may include a nonvolatile memory (not shown). A microprocessor programming port (not shown) is used to program the HMI processor 64. This is typically done once in the factory.

The HMI processor 64 contains programming to perform communication, operator interface, and event storage functions. Metered values, circuit breaker status, and event information are received by the communication interface 66. In addition, various settings may be read or written through the communication interface 66. The processor 64 maintains an internal database of the real-time values, to support the operator interface. Settings of both the PP 10 and the CAM 18 are displayed and/or altered using the operator interface. The operator interface functions involve reading and decoding the pushbuttons or switches 62, performing various functions based on inputs, and controlling the display 60. The processor 64 may change the display 60 or transmit a message to the PP 10, based on the pushbuttons 62, present display 60, and messages received from the PP 10.

The HMI nonvolatile memory (not shown) is employed by the HMI processor 64 to store events that are received from the PP 10. Events are stored in the nonvolatile memory, and are retrieved and displayed under operator control. The number of events that can be stored depends on the amount of nonvolatile memory (i.e., event storage may be increased by merely increasing the amount of nonvolatile memory). The nonvolatile memory is also used to store configuration data for the PP 10 and the CAM 18 that are uncovered by the CAI discovery process. This configuration data is used to interpret the meaning of real-time, setpoint, and event communication packets received from the PP 10 and CAM 18. The example CAM 18 only communicates with the example HMI 26 for setpoint configuration and data. It is never the source of real-time or event data. HMI/CAM communications are routed through the PP 10 using the limited address field of the CAI protocol.

Operator inputs are entered through the example pushbuttons 62. Signal conditioning circuitry filter and level-shift the signals from the pushbuttons 62, enabling the processor 64 to read their status.

The display 60 provides circuit breaker status, metering values, events information, settings, and configuration information to the operator. The display 60 is controlled by the processor 64. Information is presented through different screens, under operator control through the pushbuttons 62.

The CAI RS-422 interface 66 provides level shifting and possible voltage isolation for the communications to the PP 10.

The CAM 18 consists of the processor 20, the field-bus interface 70, and the full-duplex communication interface 70 to the device (trip unit 4) as shown in FIG. 1B. A processor programming port (not shown) is employed to program the CAM processor 20. This is typically done once in the factory.

The processor 20 contains programming to handle: (1) communications with the PP 10; (2) field bus communications; and (3) event storage. Metered values, circuit breaker status, and events information are transmitted from the PP 10 to the CAM processor 20. The CAM 18 updates and maintains a database of this information to support field bus communications. In addition, various settings may be read from or written to the PP 10. The processor 20 receives messages from the field bus 71, decodes the messages, and assembles the appropriate responses. The processor 20 also stores events that are received from the PP 10.

Events are stored in the nonvolatile memory, and are retrieved and transmitted under field bus control. The number of events that can be stored depends on the amount of nonvolatile memory (i.e., event storage may be increased by merely increasing the amount of nonvolatile memory).

The RS-422 interface 55 provides level shifting and possible voltage isolation for the communications to the PP 10.

The field bus interface and interface circuitry 70 provides the protocol and hardware layers for communications between the processor 20 and the field bus 71.

Setpoints are stored by the trip unit 4 in the non-volatile memory 14. Each group of setpoints is protected by a 32-bit checksum and stored in a triple-redundant fashion in non-volatile (e.g., without limitation, FeRAM) memory. The non-volatile memory 14 addresses of these groups are designed to be address-diverse to protect against common-mode row/column failures and are located in write-protected areas along with calibration and factory settings. Working copies of the setpoints 16 are loaded into internal processor RAM (not shown) from the non-volatile memory 14 and are also check-sum-protected from accidental alteration. Periodic self-test routines check the validity of these checksums.

The objective of the serial communication protocol's setpoint commands is to permit the HMI 26 or CAM 18 to display and modify the setpoints for an unknown protection device (e.g., trip unit 4) without any trip unit specific coding in the HMI 26 or CAM 18. In order to do this, the trip unit 4 provides the interpretation of each setpoint value as well as the range of permissible values the setpoint may take. In order to reduce the amount of information transferred from the trip unit 4, certain limitations and organization restrictions are placed on how setpoints are defined. These fall into two primary areas: (1) setpoint value definition; and (2) inter-setpoint dependencies.

All device setpoints are arranged in groups and blocks as will be described. Device setpoints are transferred via the serial communication protocol a block at a time. Any block of setpoints can be read at any time. Blocks are written in the following specific order: (1) before writing setpoints, a group of setpoints is "opened" for editing; since multiple devices (HMI 26 or CAM 18) may attempt to alter setpoints simultaneously, the open process reserves the group for editing exclusively by the opening device; multiple devices may not edit the same group simultaneously; (2) when a group is opened for editing, a temporary copy of the group's setpoints is made to act as a writable scratchpad copy; during editing, the original setpoint values continue to control operation of the device until all the group's setpoints have been written, checked for validity and internal consistency, and accepted by the trip unit 4; (3) setpoints are written a block at a time starting at the lowest numbered block and progressing to the last (highest number); before each block is written, it is read from the trip unit 4 along with the current description of each setpoint within the block; this permits dependencies from previous blocks to control the value of setpoints written in higher-numbered blocks; and (4) after the last (highest numbered) block of setpoints has been written and accepted in the group, the group of setpoints are "applied" to cause the trip unit 4 to begin operation using the new values.

The serial communication protocol provides significant freedom in the definition of setpoints according to the following example rules: (1) a setpoint is a contiguous set of bits in the setpoint block; (2) not all bits in a setpoint block need to be defined as setpoints; unused bits are permitted within the block; during the upload/download process, these unused bits are written with the same values as uploaded; (3) setpoints are read (transmitted/uploaded) and written (received/downloaded) within the block structure defined by the setpoint description commands; and (4) setpoint format is selected from a set of predetermined formats; permissible values a setpoint may take are describable by: (a) a minimum value, (b) a step value, (c) a maximum value, and (d) an arbitrary "special" value; additionally, masking of values within the range is permitted up to a maximum of 32 permissible values; these values may be dependent on the setting of other setpoint(s), but under all circumstances, permissible values fit this restriction.

The device (e.g., trip unit 4) manages setpoint dependencies rather than communicating dependency algorithm(s) and having the CAM 18 or HMI 26 determine appropriate values. This "thin-client" approach employs several rules in the client software (CAM 18 or HMI 26) and forces the server (trip unit 4) firmware to enforce the dependency rules. In order to do this successfully, the device organizes the setpoints according to these rules as will be described.

The device's setpoints consist of all the configuration values used by the device to perform its function. These setpoint variables are read-only or downloadable, and are defined in such a fashion that they are describable by the setpoint commands. In order to support interrelationships (dependencies) between certain setpoints, they are grouped appropriately.

A setpoint group is a logical collection of setpoints that are functionally related and can be independently updated. In other words, a change in the value of a downloadable setpoint in one group has no effect on the function of any setpoint in another group. A limited inter-group dependency is permitted where a downloadable setpoint in one group is echoed as a read-only setpoint in a number of other group(s). This dependency structure does not invalidate the setting of any other setpoint when the primary setpoint is changed.

A setpoint block is a collection of setpoints from a group that are uploaded and downloaded in a single contiguous packet. The block numbers within any group are contiguous starting with zero. The block number determines the dependency hierarchy, with zero being the highest level having no dependent setpoints within it. Within the block, setpoints are numbered sequentially starting with setpoint number zero.

Setpoint dependencies are arranged by block hierarchy number. If a setpoint's interpretation or set of permissible values depends on the value of another setpoint, the dependent setpoint is located in a block of higher number than its controlling setpoint(s). Circular dependencies in which, for example, A depends on B which depends on C which depends on A are not employed.

Figure 5:
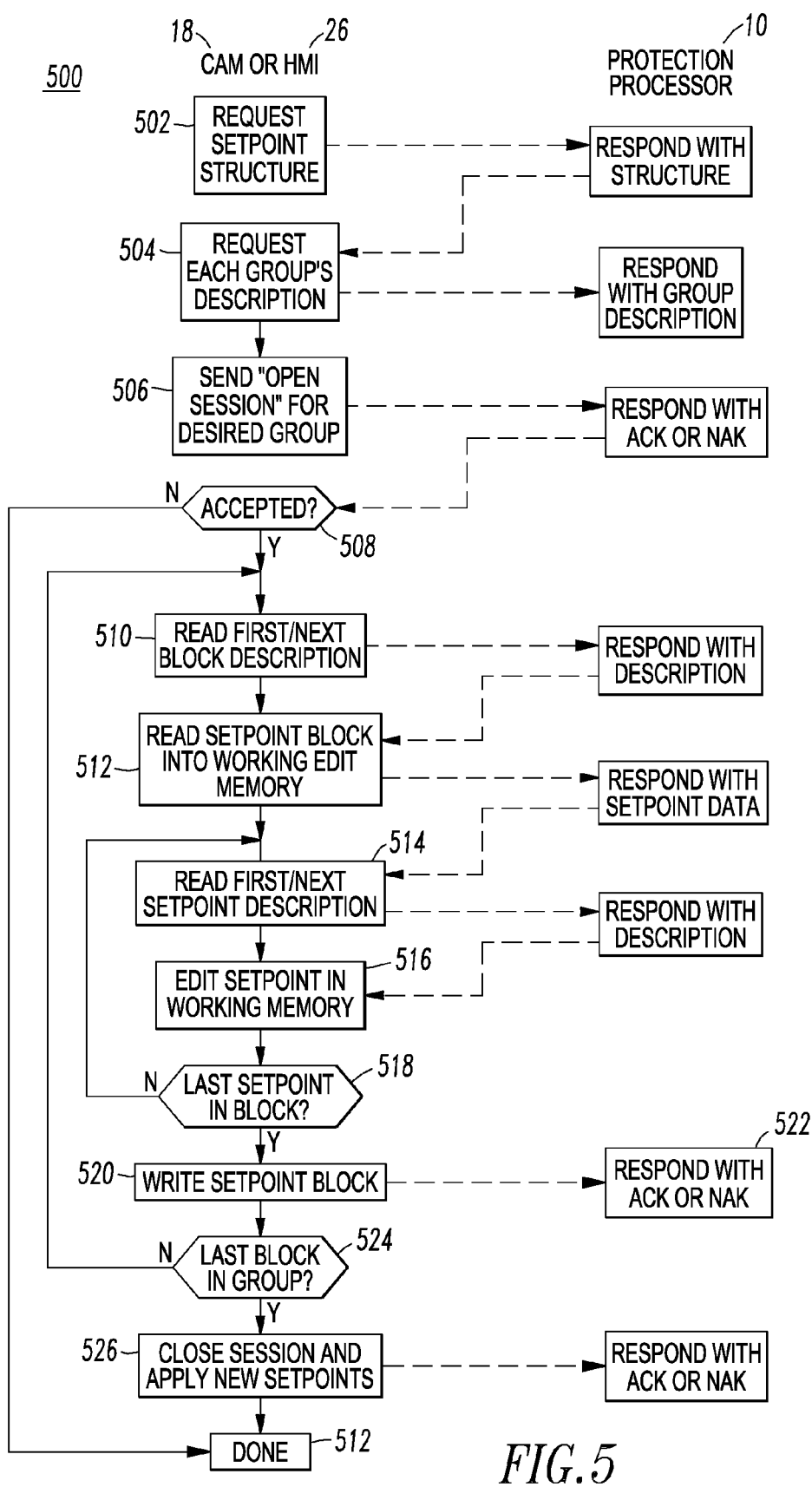
FIG. 5 is a flow chart of a setpoint group update initiation process of the protection processor of FIG. 1A and the CAM or HMI processors of FIG. 1B.
Figure 6:
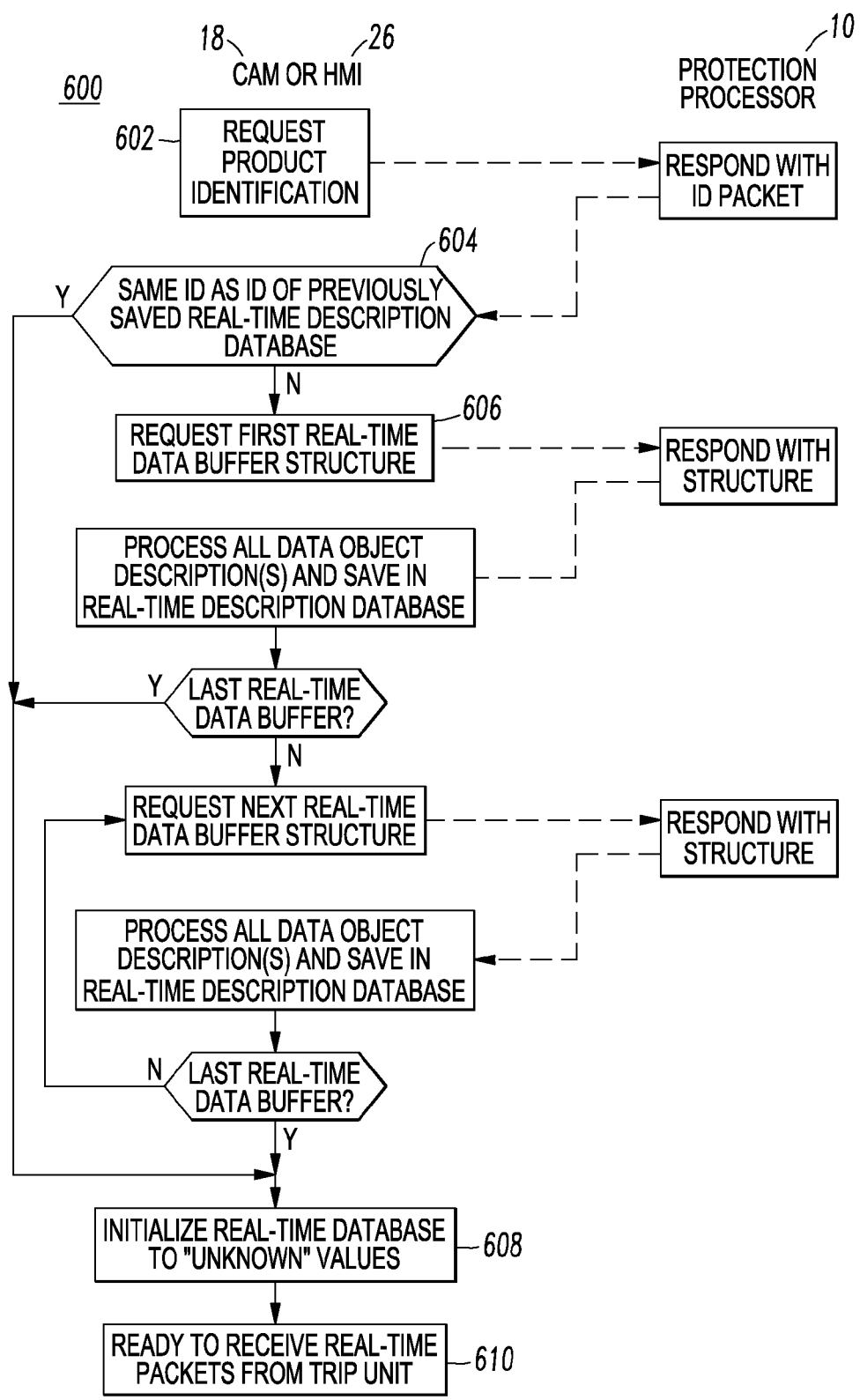
FIG. 6 is a flow chart of a real-time data discovery process of the protection processor of FIG. 1A and the CAM or HMI processors of FIG. 1B.

Before setpoints can be displayed or changed, the number of setpoints, their location in setpoint data packets, and how they are arranged in groups and blocks is ascertained by a setpoint structure discovery process 500 of FIG. 5. Additionally, each setpoint's format, range, and interpretation is acquired. A series of serial protocol commands provides this information to the CAM 18 or HMI 26.

First, at 502, the HMI 26 or CAM 18 initially requests the setpoint structure of the device (e.g., trip unit 4). This provides the total number of setpoint groups and number of blocks within each group.

Next, at 504, the HMI 26 requests each non-empty group's description and selects a group for editing. The group description provides appropriate text string pointers employed to generate the appropriate HMI display for group editing. It then requests, at 506, an "open session" for the selected group. The trip unit 4 creates a scratch-pad image of the selected group for editing. All blocks written in this group are updated in the temporary scratch-pad image and do not affect operation of the trip unit 4 until all blocks have been updated and the session is closed and the setpoints are applied.

If the open session was accepted, at 508, the HMI 26 reads the description of the first block in the group at 510. The block description provides the number of setpoints within the block along with text string pointers employed to generate the appropriate HMI display for block editing. If the open session was rejected, another device has opened a session, the group cannot be edited at this time, and the process 500 exits at 512. The trip unit 4 contains a time-out mechanism to prevent a session from remaining open indefinitely.

At 512, the HMI 26 or CAM 18 proceeds to read the setpoint block into working memory for edit. Unused data locations in the setpoint block are re-written with the same data as originally read.

The description of every setpoint in the block is obtained at 514,516,518. The setpoint description provides the following information about each setpoint: (1) configuration: type, visibility, dependency flags (special value, range, conversion); (2) location: byte and bit offset within the setpoint block packet; (3) format: information employed to convert the raw setpoint value into a displayable form such as signed/unsigned, hex/decimal, encoded, special value, text string; (4) setpoint size; (5) precision; (6) scaling; (7) range: maximum, minimum, step value; (8) engineering units; and (9) setpoint name text pointer.

After all setpoints have been displayed and/or modified in the block, the block is written at 520. The trip unit 4 validates all values in the block before acknowledging the write operation at 522.

This process 500 repeats at 524 until all blocks have been updated.

Finally, after all blocks have been written, the HMI 26 or CAM 18 closes the session and requests that the new values be "applied" at 526. The trip unit 4 begins using the new group's setpoints if no error was detected.

Real-time data values are computed periodically by the trip unit 4 from the data acquired by the sampling interrupt service routines. This real-time data is stored in the PP 10 in database 402 (FIG. 4). This database 402 contains two types of real-time data: (1) present value data; and (2) max/min data. Whenever a real-time data value changes in the real-time database 402, it is marked for transmission to both the HMI 26 and CAM 18. This "data push" philosophy has advantages over a conventional master/slave "data-pull" approach: (1) communication bandwidth is not wasted requesting and sending data that is already available in the CAM 18 or HMI 26; and (2) latency of changed data is minimized since whenever a data value changes, it is made available to the CAM 18 or HMI 26.

The real-time database 402 (FIG. 4) in the PP 10 is maintained in RAM (not shown) and is divided into two sections including present value real-time data and max/min real-time data. The present value real-time data contains the last measured value for primary metered data, such as currents, voltages, frequency and power; and power quality data, such as crest factor, power factor, THD, demand power and demand current. Additionally, operating status, such as circuit breaker state and operating temperature, is also maintained. This data is volatile over a power-cycle since it is calculated every line-cycle by the data acquisition process.

The max/min real-time data is maintained in non-volatile memory 14 and contains values that are maintained over a power cycle. Data, such as maximum and minimum values for current, current demand, power, power demand, voltages, frequency, power factor, are saved. In general, each value also has two time-tag attributes associated with it: (1) time of max/min occurrence; and (2) time of last value reset. Because of the need to store energy in a non-volatile fashion, energies are also stored in this part of the real-time database 402.

Before real-time data can be displayed by either the HMI 26 or CAM 18, the structure of real-time data message packets is "learned". Real-time data is sent from the trip unit 4 to both the HMI 26 and CAM 18 as new data values are obtained. To maximize the efficiency of the communication, real-time data values are arranged for transmission in groups of data values that are likely to change at the same time. For example, voltages and currents are sent every line cycle when they are computed, but the max/min data are only sent when they change. A series of serial protocol commands provides this real-time data packet structure information to the HMI 26 or the CAM 18 in process 600 shown in FIG. 6.

First, at 602, the HMI 26 or CAM 18 requests the product identification packet. If the ID is the same as the previously saved ID, at 604, the learning process is reduced by using the previously saved real-time description database.

Otherwise, if the product ID is new, the first of the real-time buffer descriptions is requested at 606. The number of real-time buffers is specified in the product identification packet.

The real-time buffer description contains a data description for each of the data objects sent in that real-time buffer. Each data object description contains the following information: (1) Object ID specifies one of the predetermined data names, such as "Phase A Current", "Minimum Source Ground Current", "PF—Apparent"; for example and without limitation, several hundred different data objects are available in a predetermined list; (2) Data Object Location specifies where in the real-time data packet the data object is located; this is simply the byte-offset from the start of the packet; (3) Data Format and Modifier specifies the size of the data object, its arithmetic format, resolution, and in the case of the time format, whether the time attribute is time-of-occurrence or reset; and (4) Data Display String is a pointer to an alphanumeric string that may be used to display the data on an HMI 26.

At 608, after all the real-time buffer data descriptions have been read, they are saved for use in processing real-time packets received from the trip unit 4. Until that time, real-time data packets are ignored, since the meaning of their contents is undetermined.

Finally, at 610, the real-time database 402 is then initialized based on the information in the real-time description database. In general, each data object in the real-time description database has the following attributes: (1) a validity flag; initialization of the real-time description database sets this flag to "invalid"; this flag will be set to "valid" when a real-time packet is received containing this data object; (2) a data value; (3) a time-of-occurrence; in general, this attribute is only used for "historical" data types, such a maximum/minimum; and (4) a time-of-reset, in general, this attribute is only used for "historical" data types such a maximum/minimum.

Figure 7:
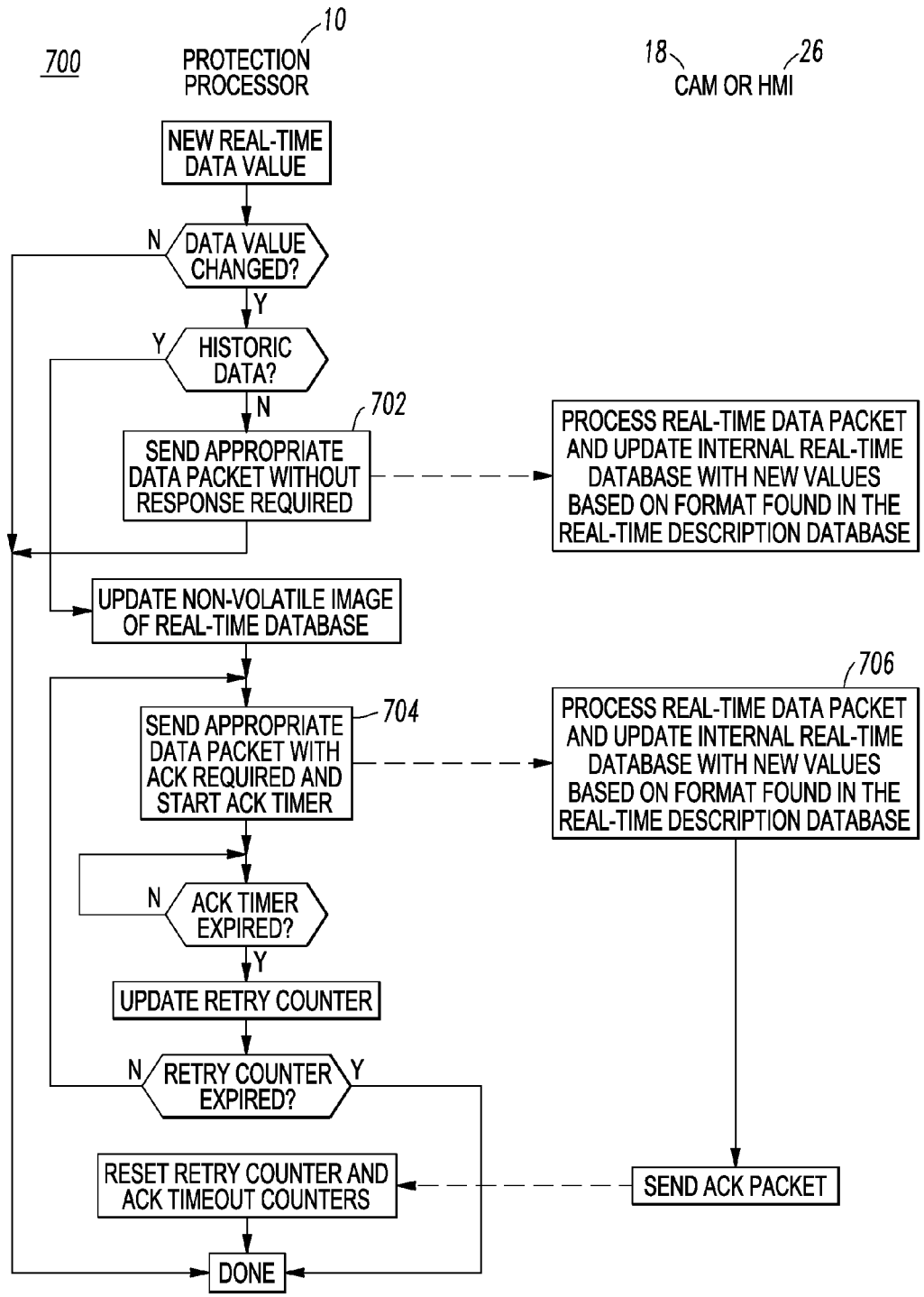
FIG. 7 is a flow chart of a real-time data update process of the protection processor of FIG. 1A and the CAM or HMI processors of FIG. 1B.

After the real-time data packet discovery process 600 has been completed, the HMI 26 or CAM 18 is capable of processing real-time data packets received from the PP 10. Whenever the PP 10 has a number of new real-time data value(s), it will send the data in the appropriate real-time packet. If the data is being generated periodically, it will use a write, without acknowledge, type of transfer at 702 of FIG. 7. If the data is historical (e.g., maximum or minimum; energy) it will send the data as a write, with acknowledge, type of transfer at 704 to ensure that the data has been recorded by the HMI 26 and CAM 18 at 706. This process 700 is shown in FIG. 7 as a state-representation of the process. Delays between activities return the communication processing code to the main loop (FIG. 2) to process other activities.

The CAM 18 and HMI 26 manage various events. The disclosed concept provides the ability to manage and display event data from different units, where each unit has a unique, unknown events configuration. Event generation occurs in the PP 10 with archival storage located in both the CAM 18 and HMI 26. The PP 10 has only limited event storage and after an event has been transferred to both the HMI 26 and CAM 18, it is removed from event storage in the PP 10.

Figure 8:
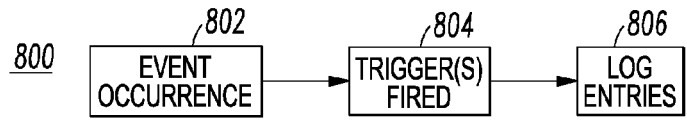
FIG. 8 is a flow chart of event capture by the CAM or HMI processors of FIG. 1B.

Events are captured as shown in process 800 of FIG. 8. The occurrence of an event, at 802, causes one or more triggers to fire at 804. When a trigger fires, data entries are made into all logs associated with that trigger at 806. By definition, an event can fire one or more triggers at 804. A trigger causes entries to be made in one or more logs at 806. A log is associated with one and only one trigger. Each log contains data entries from a single real-time data source (e.g., without limitation, Ia; Vb; Pf; Pfwd). Associated with each entry is also one or more time tags (e.g., without limitation, time of occurrence; time of reset). For example, true real-time values only have a time of occurrence. Historical real-time values (e.g., without limitation, Ia (max)) additionally have a time of reset.

Figure 9:
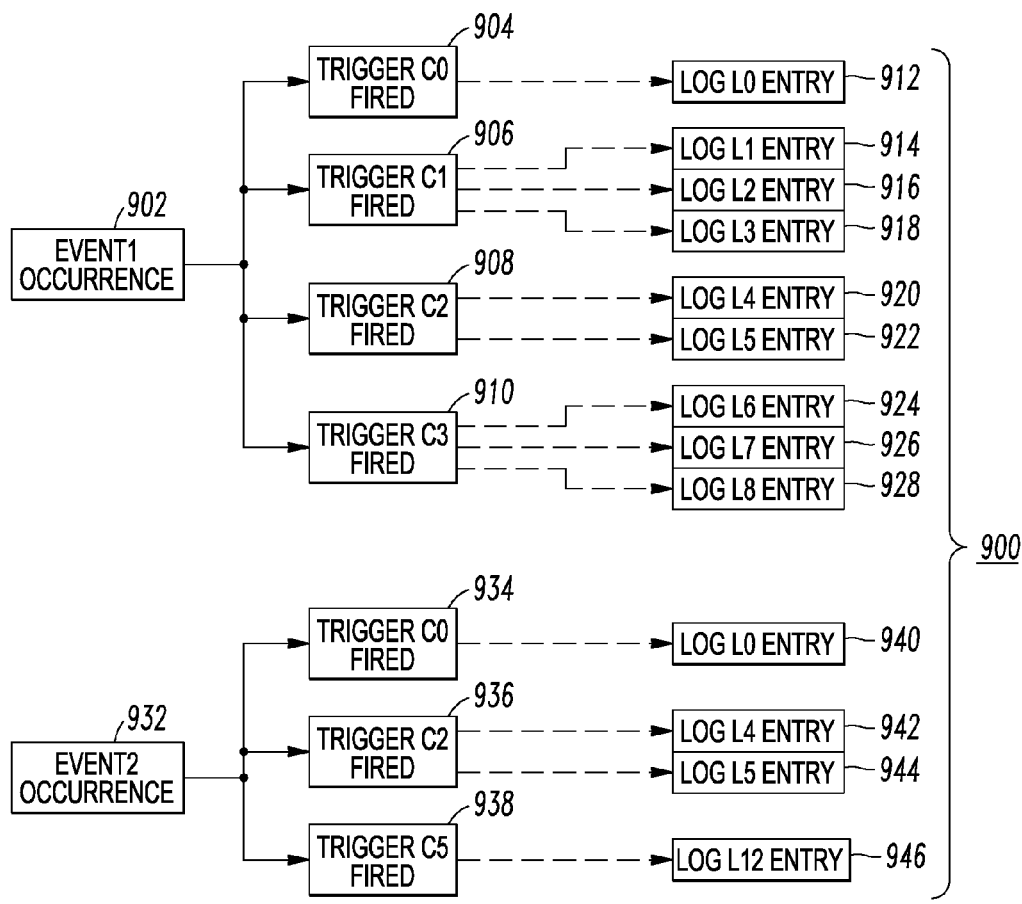
FIG. 9 is a flow chart of example log entry by trigger occurrences for the CAM or HMI processors of FIG. 1B.
Figure 10:
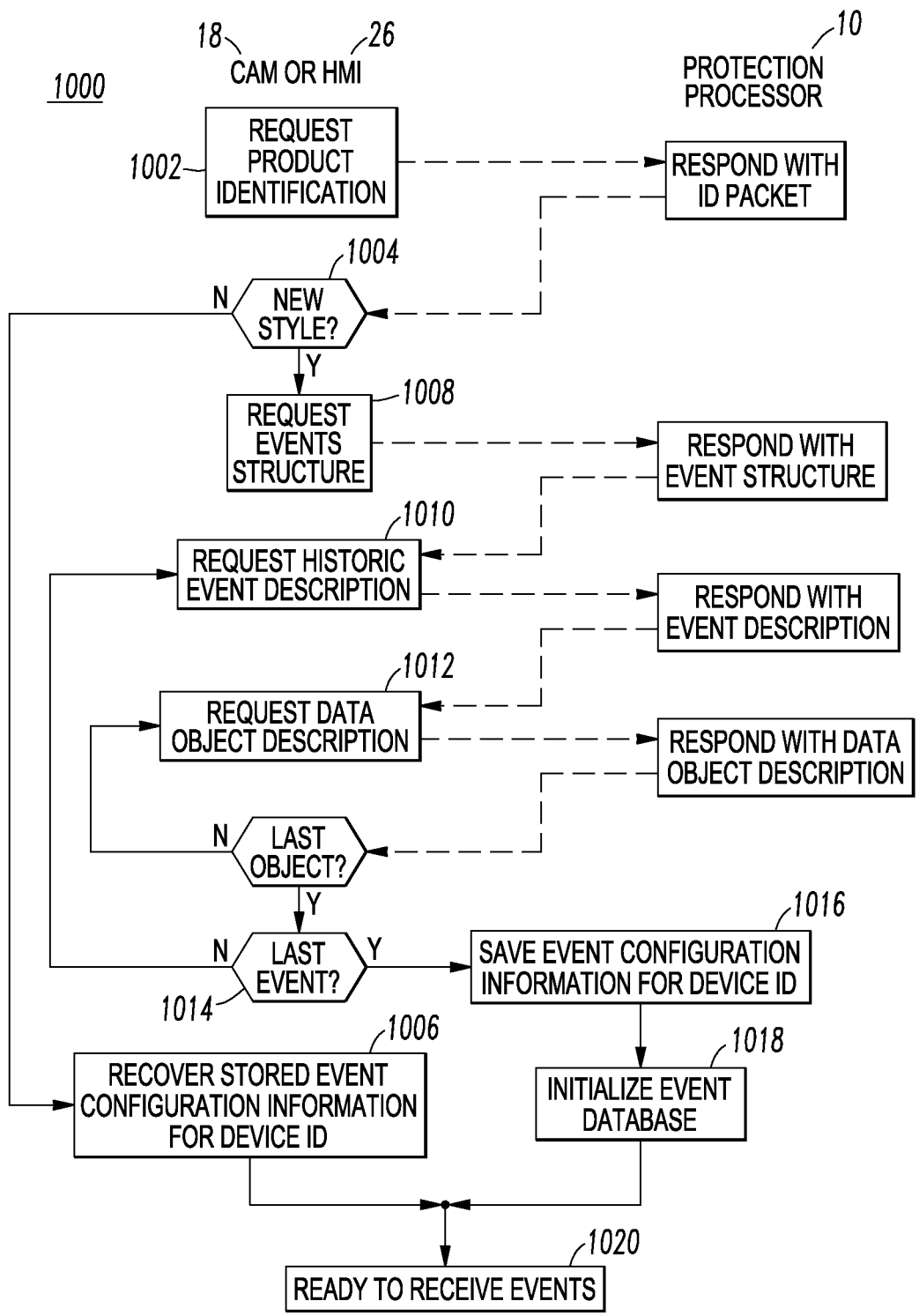
FIG. 10 is a flow chart of an event configuration discovery process of the protection processor of FIG. 1A and the CAM or HMI processors of FIG. 1B.

FIG. 9 shows an example 900. The Event1 occurrence at 902 fires four triggers, C0-C3 at 904,906,908 and 910. C0 causes an entry to be made in log L0 at 912. C1 causes an entry to be made in logs L1-L3 at 914,916 and 918. C2 causes an entry to be made in logs L4 and L5 at 920 and 922. C3 causes an entry to be made in logs L6-L8 at 924,926 and 928.

The Event2 occurrence at 932 fires three triggers, C0, C2, and C5 at 934,936 and 938. C0 and C2 again cause an entry to be made in logs L0, L4, and L5 at 940,942 and 944. C5 causes an entry to be made in log L12 at 946.

For events configuration and processing, the CAM 18 and HMI 26 allocate memory for each trigger that is active. Events are received from the PP 10 in one or more event buffers. When an event is received from the PP 10, the CAM 18 and HMI 26 store the logged data in the memory allocated for that log's particular trigger. The data flow and steps taken for configuring and processing events is shown in process 1000 of FIG. 10. After a reset, the HMI 26 and CAM 18 establish communications and read the device style at 1002 from the device to which it is coupled.

At 1004, if the device style matches its existing style (stored in nonvolatile memory (e.g., 22)), the HMI 26 or CAM 18 has already been configured for this device and operation resumes at 1006. If the device style does not match its existing style (i.e., there is a new style), then the HMI 26 and CAM 18 delete the previously stored configuration and begin to retrieve the Events Configuration from the device.

Hence, if a new events configuration needs to be discovered, the HMI 26 or CAM 18 first reads the "Event Structure" at 1008. This provides the following information: (1) number of data object logs; (2) number of oscillographic data buffers; (3) number of historic event data buffers; (4) number of event triggers; and (5) trigger state and names for all triggers.

At 1010, the description of each historic event data buffer is requested. This provides the following information about each data buffer: (1) log ID of each data entry in the specified historic event buffer; and (2) location of each data entry in the event buffer.

At 1012, the description of each object is requested. This provides the following information about each data object: (1) trigger association; (2) data object definition and configuration; (3) data object format and conversion parameters; (4) engineering units of data object; and (5) data object name string pointer.

After all the configuration information is collected at 1014, the HMI 26 or CAM 18 saves the event configuration for that device ID at 1016 to reduce discovery time on future power cycles when it is connected to the same device.

The Events Configuration provides enough information for the HMI 26 or CAM 18 to configure its database to process the events buffers, store the logged information, and retrieve and display (by the HMI 26) or reformat and transmit (by the CAM 18) the information. Events Configuration includes the following information: (1) active trigger assignments; and (2) event buffer descriptions: (a) log ID's and location in the buffer, and (b) log descriptions: (i) trigger association, (ii) real time object tag, (iii) data format, (iv) scaling coefficients, (v) minimum value; (vi) maximum value; (vii) engineering units string, and (viii) object description string.

Finally, at 1018, if a new event configuration was discovered, the previously stored event database is purged, since the HMI 26 or CAM 18 is now connected to a new device and the previously stored data is not applicable.

Figure 11:
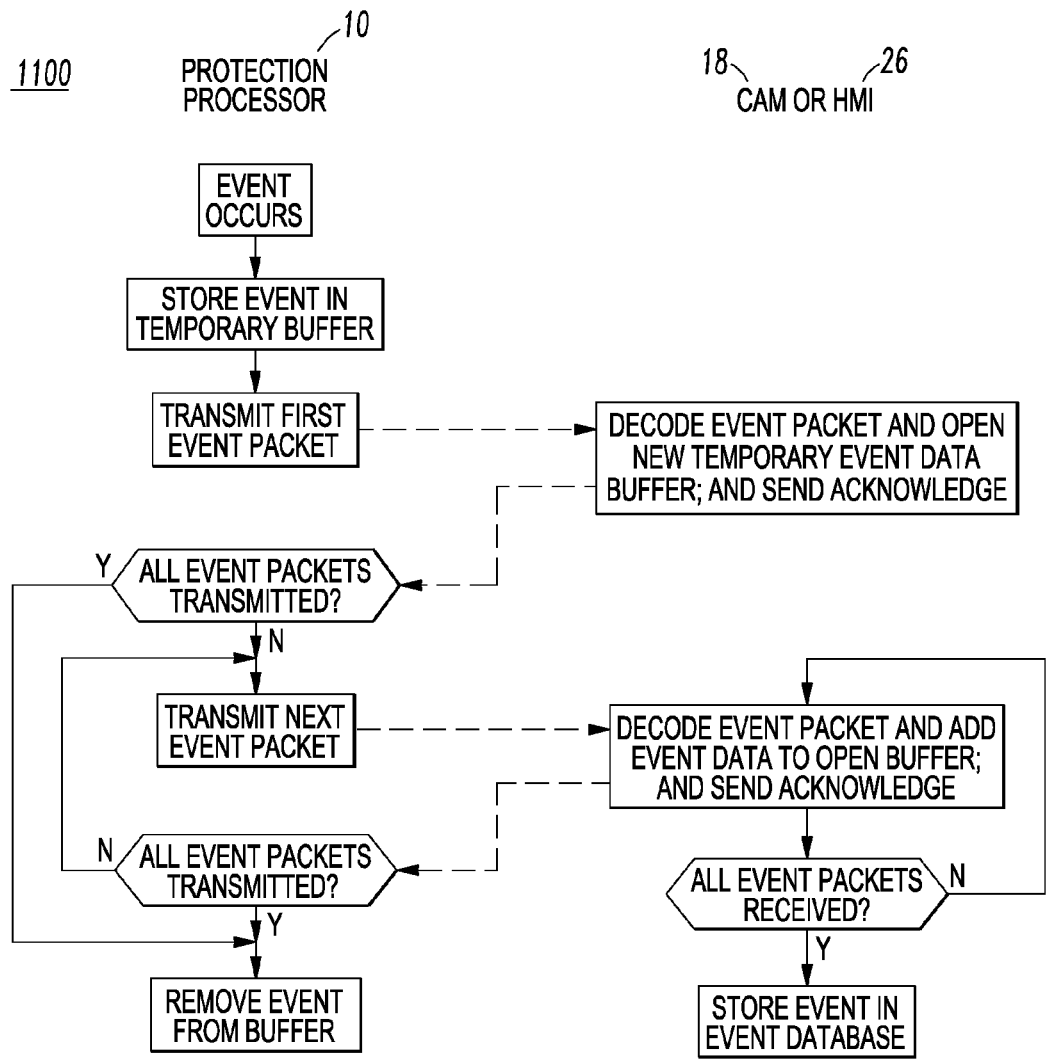
FIG. 11 is a flow chart of an event process of the protection processor of FIG. 1A and the CAM or HMI processors of FIG. 1B.

After the HMI 26 or CAM 18 has discovered the event structure of a new device at 1018 or confirmed that it is connected to the same device as previously configured at 1006, it is ready to receive event data packets at 1020. This process 1100 is shown in FIG. 11.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A trip unit for a circuit breaker, said trip unit including a plurality of capabilities defining one trip unit style selected from a plurality of different trip unit styles, said trip unit comprising:
    a processor comprising a communication interface including a communication protocol; and
    a communication adapter module comprising a first communication interface including said communication protocol, and a second communication interface, said communication adapter module being structured to learn the plurality of capabilities of said trip unit from said processor employing said communication protocol, and to communicate with any of said plurality of different trip unit styles including said one trip unit style.

2. The trip unit of claim 1 wherein the second communication interface of said communication adapter module is structured to provide a communication connection to a communication network.

3. The trip unit of claim 2 wherein said communication network is a selected field bus of a plurality of different field busses; wherein said communication adapter module is a selected style of a plurality of different styles; and wherein said selected style corresponds to said selected field bus.

4. The trip unit of claim 1 wherein said processor is a protection processor comprising a plurality of trip and status indicators.

5. The trip unit of claim 1 wherein said processor is a protection processor structured to receive a plurality of inputs and perform a protection function employing said inputs.

6. The trip unit of claim 1 wherein said processor further comprises a unique style identifier; wherein said processor is structured to provide a communication message structure of real-time data, event data and setpoints linked to the unique style identifier as at least part of the plurality of capabilities of said trip unit; and wherein said communication adapter module is structured to learn the communication message structure of said trip unit from said processor employing said communication protocol.

7. A trip unit for a circuit breaker, said trip unit including a plurality of capabilities defining one trip unit style selected from a plurality of different trip unit styles, said trip unit comprising:
    a processor comprising a communication interface including a communication protocol; and
    a communication adapter module comprising a first communication interface including said communication protocol, and a second communication interface, said communication adapter module being structured to learn the plurality of capabilities of said trip unit from said processor employing said communication protocol, and to communicate with any of said plurality of different trip unit styles including said one trip unit style,
    wherein said processor is a protection processor; wherein said trip unit comprises three independent functional sections including said protection processor, an operator panel and said communication adapter module; wherein said three independent functional sections are structured to communicate employing two full-duplex serial links; and wherein the communication interface of said protection processor and the first communication interface of said communication adapter module provide one of said two full-duplex serial links.

8. The trip unit of claim 7 wherein said protection processor and said operator panel are combined into a single unit.

9. The trip unit of claim 7 wherein said protection processor is structured to operate independently of said operator panel and said communication adapter module to trip open said circuit breaker.

10. The trip unit of claim 7 wherein said protection processor is structured to receive a plurality of inputs and perform a protection function employing said inputs; wherein said plurality of inputs include a plurality of setpoints; and wherein said protection processor is further structured to determine, as part of said protective function, real-time and historical event data, and to communicate said real-time and historical event data to said operator panel and said communication adapter module.

11. The trip unit of claim 10 wherein said protection processor is further structured to communicate changes in the plurality of capabilities of said trip unit to said operator panel and said communication adapter module after initialization of said trip unit.

12. The trip unit of claim 10 wherein modifications or additions to said plurality of setpoints and the plurality of capabilities of said trip unit are implemented by modification of only said protection processor.

13. The trip unit of claim 7 wherein said operator panel comprises a processor, a display and a plurality of input members; and wherein the processor of said operator panel is structured to enter a plurality of setpoints to said protection processor, store a plurality of historical events from said protection processor, and adjust real-time data of said protection processor.

14. The trip unit of claim 7 wherein said operator panel is structured to be field replaceable.

15. A method of communication comprising:
    employing a trip unit including a plurality of capabilities defining one trip unit style selected from a plurality of different trip unit styles;
    employing a processor comprising a communication interface including a communication protocol;
    employing a communication adapter module comprising a first communication interface including said communication protocol, and a second communication interface;
    learning by said communication adapter module the plurality of capabilities of said trip unit from said processor employing said communication protocol; and
    communicating by said communication adapter module with any of said plurality of different trip unit styles including said one trip unit style.

16. The method of claim 15 further comprising:
employing a unique style identifier with said processor;
providing by said processor a communication message structure of real-time data, event data and setpoints linked to the unique style identifier as at least part of the plurality of capabilities of said trip unit; and
learning by said communication adapter module the communication message structure of said trip unit from said processor employing said communication protocol.

17. The method of claim 15 further comprising:
determining changes in data by the processor; and
autonomously communicating the changed data by the processor to the communication adapter module using the communication protocol.

18. A method of communication comprising:
employing a trip unit including a plurality of capabilities defining one trip unit style selected from a plurality of different trip unit styles;
employing a processor comprising a communication interface including a communication protocol;
employing a communication adapter module comprising a first communication interface including said communication protocol, and a second communication interface;
learning by said communication adapter module the plurality of capabilities of said trip unit from said processor employing said communication protocol;
communicating by said communication adapter module with any of said plurality of different trip unit styles including said one trip unit style;
employing a protection processor as said processor;
employing said trip unit comprising three independent functional sections including said protection processor, an operator panel and said communication adapter module;
communicating by said three independent functional sections by employing two full-duplex serial links; and
providing one of said two full-duplex serial links with the communication interface of said protection processor and the first communication interface of said communication adapter module.

19. The method of claim 18 further comprising:
operating said protection processor independently of said operator panel and said communication adapter module.

20. An electrical switching apparatus comprising:
separable contacts;
an operating mechanism structured to open and close said separable contacts; and
a trip unit including a plurality of capabilities defining one trip unit style selected from a plurality of different trip unit styles, said trip unit comprising:
a processor comprising a communication interface including a communication protocol, and
a communication adapter module comprising a first communication interface including said communication protocol, and a second communication interface, said communication adapter module being structured to learn the plurality of capabilities of said trip unit from said processor employing said communication protocol, and to communicate with any of said plurality of different trip unit styles including said one trip unit style.

21. The electrical switching apparatus of claim 20 wherein said processor further comprises a unique style identifier; wherein said processor is structured to provide a communication message structure of real-time data, event data and setpoints linked to the unique style identifier as at least part of the plurality of capabilities of said trip unit; and wherein said communication adapter module is structured to learn the communication message structure of said trip unit from said processor employing said communication protocol.

* * * * *